United States Patent [19]

Shaver

[11] 4,103,691
[45] Aug. 1, 1978

[54] COMBINE WITH MEANS FOR REDUCING THE BOUNCE OF ACCELERATED GRAIN

[75] Inventor: J. Lyle Shaver, Blue Springs, Mo.

[73] Assignee: Allis-Chalmers Corporation, Milwaukee, Wis.

[21] Appl. No.: 713,536

[22] Filed: Aug. 11, 1976

Related U.S. Application Data

[63] Continuation-in-part of Ser. No. 592,713, Jul. 2, 1975, Pat. No. 4,007,744.

[51] Int. Cl.² ............................................. A01F 12/00
[52] U.S. Cl. .................................... 130/24; 130/27 Q; 56/14.6
[58] Field of Search ................. 130/24, 27 Q; 56/14.6

[56] References Cited

U.S. PATENT DOCUMENTS

| 2,542,346 | 2/1951 | Mormann | 130/24 |
| 4,007,744 | 2/1977 | Shaver | 130/27 Q |

*Primary Examiner*—Russell R. Kinsey
*Attorney, Agent, or Firm*—Charles L. Schwab

[57] ABSTRACT

A combine is provided with a threshing cylinder which rotates within a foraminous cage with a concave causing the grain to be separated from the severed crop. The separated grain chaff, and other small lightweight portions of the crop being harvested, pass through the concave and other parts of the cage and thence through a transverse slot. The material passing through the transverse slot is accelerated downwardly by a pair of counter-rotating accelerator rolls at substantially right angles to a rearward directed sheet or layer of air which serves to separate the lightweight material from the kernels of grain. The lightweight material is blown rearwardly over the cleaning shoe assembly of the combine and the heavier grain kernels continue in their downwardly direction impacting with the grain pan below the accelerator rolls. The grain pan of the longitudinally oscillated cleaning shoe assembly is provided with a plurality of longitudinally spaced transverse baffles which extend upwardly and rearwardly terminating at a height which is sufficient to maintain a quantity of grain on the pan in spite of the oscillating movement to which it is subjected during operation. The grain accelerated downwardly impacts with the grain retained on the grain pan, thereby substantially reducing the bounce of the grain as compared to that which would occur if the grain pan were of conventional construction wherein a substantial portion of the upward facing surface of the conventional grain pan would be exposed during operation.

3 Claims, 4 Drawing Figures

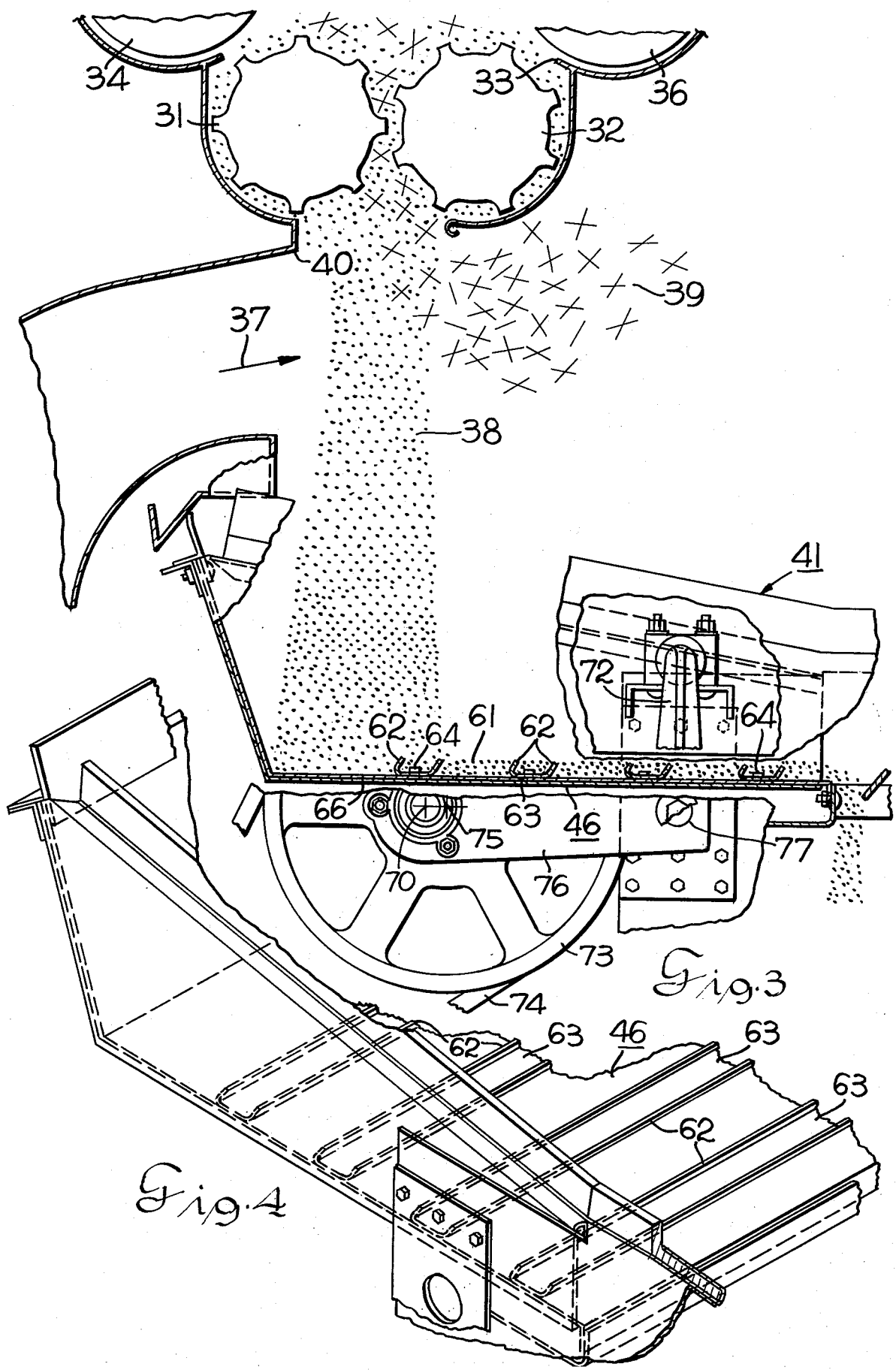

COMBINE WITH MEANS FOR REDUCING THE BOUNCE OF ACCELERATED GRAIN

CROSS-REFERENCE TO RELATED APPLICATIONS

U.S. patent application Ser. No. 592,713 on a grain accelerator precleaner, filed July 2, 1975 and now U.S. Pat. No. 4,007,744, illustrates a combine in which the present invention is particularly useful. The beforementioned application shows a threshing cylinder, concave, accelerator rolls and cleaning shoe assembly with grain pan similar to that illustrated in the present application this application is a continuation-in-part of the aforementioned U.S. Pat. No. 4,007,744.

BACKGROUND OF THE INVENTION

Heretofore, grain pans of various shapes have been used in or suggested for threshers and combines. Typical of these is the corrugated construction shown in U.S. Pat. No. 2,574,010. In the saw-toothed section grain pans shown in U.S. Pat. Nos. 2,190,262 and 3,913,589, transversely extending pockets are formed in the bottom of the grain pan by a surface which slopes gently upwardly and rearwardly and a steep surface which is approximately vertical at the front of the pocket. The gentle sloping surface permits the grain to move rearward during oscillation of the grain pan. The oscillating movement of the grain pan moves the grain rearwardly off the grain pan and leaves a substantial portion of the grain pan surface exposed during operation. U.S. Pat. No. 2,542,346 illustrates and describes a combine grain pan having transverse flanges which extend upwardly and forwardly to provide pockets for trapping the grain to prevent overloading of the cleaning shoe as the combine sequentially operates up and down hills. The transverse baffles or plates, illustrated in FIGS. 4, 5 and 6 of the aforementioned U.S. Pat. No. 2,542,346 are adjustable from a forwardly inclined position to an upright, vertical position. When the combine moves downhill the grain pan becomes loaded with grain, and if the combine next moves uphill the upwardly and forwardly inclined baffles or plates, shown in U.S. Pat. No. 2,542,346, are intended to hold some of the grain on the grain pan thereby preventing overloading of the cleaning mechanism of the combine.

BRIEF DESCRIPTION OF THE INVENTION

In a combine wherein accelerator rolls accelerate a mixture of grain and chaff downwardly toward the cleaning shoe assembly, a grain pan is provided having transverse baffles of such size and number so as to retain a layer of grain upon the grain pan. The layer of grain serves to absorb the impact of the downwardly accelerated grain and thereby prevent grain loss which would otherwise occur from the accelerated grain striking and bouncing from a bare surface of the grain pan.

BRIEF DESCRIPTION OF THE DRAWINGS

FIG. 3 is an enlarged partial side view of the combine shown in FIG. 1 showing the grain and chaff being accelerated downwardly by the accelerator rolls toward the grain pan of the cleaning shoe assembly; and FIG. 4 is a perspective view of part of the grain pan illustrated in FIGS. 1 and 3.

DETAILED DESCRIPTION OF THE INVENTION

Figure 1:
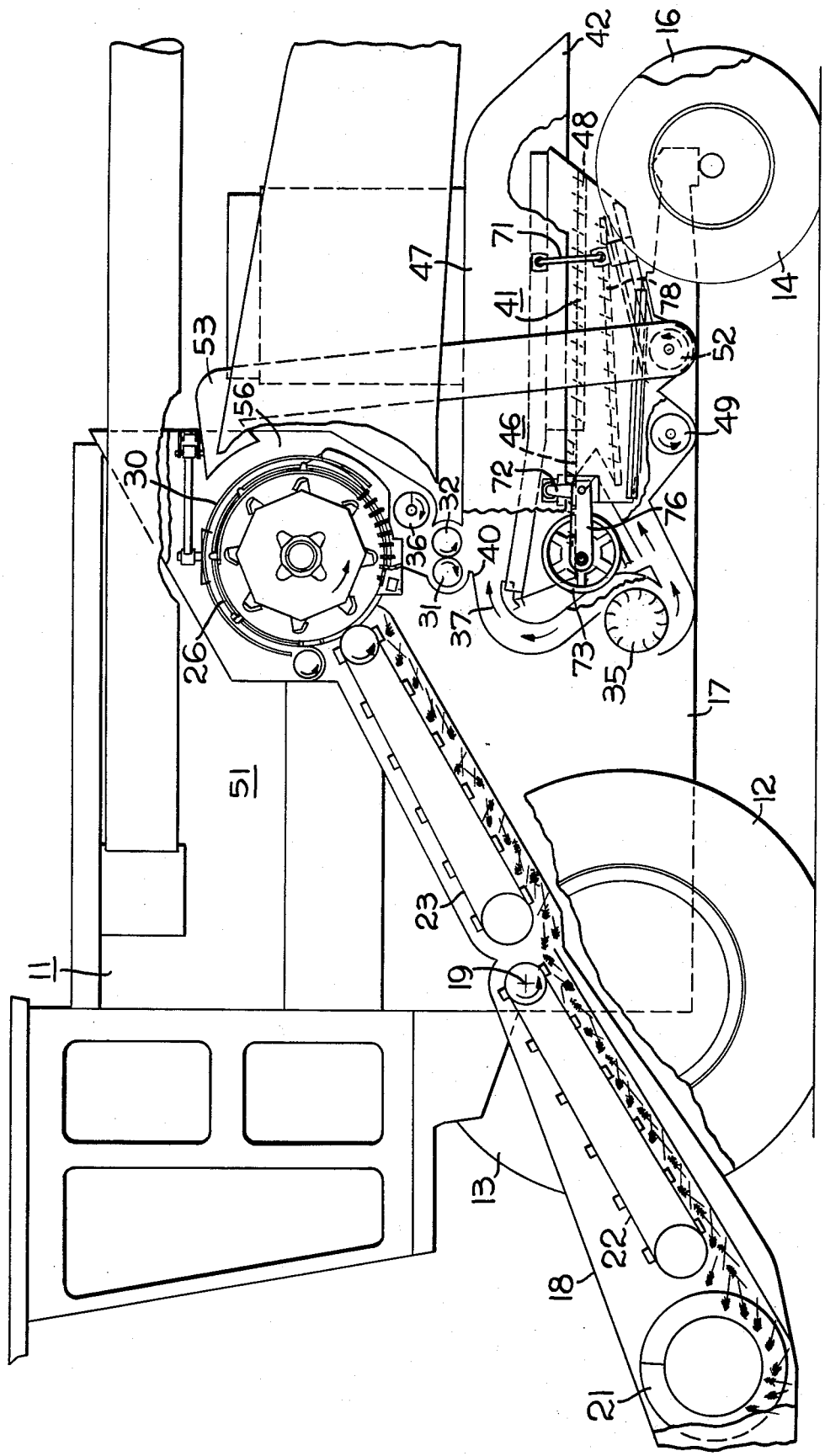
FIG. 1 is a side view of a combine with some parts shown schematically and some parts broken away for illustration purposes.

Referring to FIG. 1, a combine 11 in which the present invention is illustrated, includes a pair of front drive wheels 12, 13 and a pair of steerable rear wheels 14, 16 supported on a main frame 17. A header 18 is pivotally connected to the main frame 17 on a transverse axis 19 for vertical adjustment of the cutting height by appropriate means, not shown. An auger 21 with oppositely pitched flights moves the cut grain inwardly from the transversely outwardly extending ends of the header 18 to a central location where a first slat type feeder 22 moves the cut stalks upwardly and rearwardly to a second slat type feeder 23. The feeder 23 moves the cut stalks to a threshing cylinder 24 disposed within a foraminous cylindrical cage 26 which may be formed of heavy gage wire screen. The cylindrical cage 26 is rigidly secured at its opposite axial ends to the sidewalls 29, 30 of the combine and has an appropriate opening near the upper end of the conveyor 23 to permit the cut material to move into the interior of the cage where it is threshed by the threshing cylinder 24. The threshing cylinder 24 is rotatably mounted at its opposite ends to the sidewalls 29, 30 of the combine for rotation about a transverse pivot axis 27.

Figure 2:
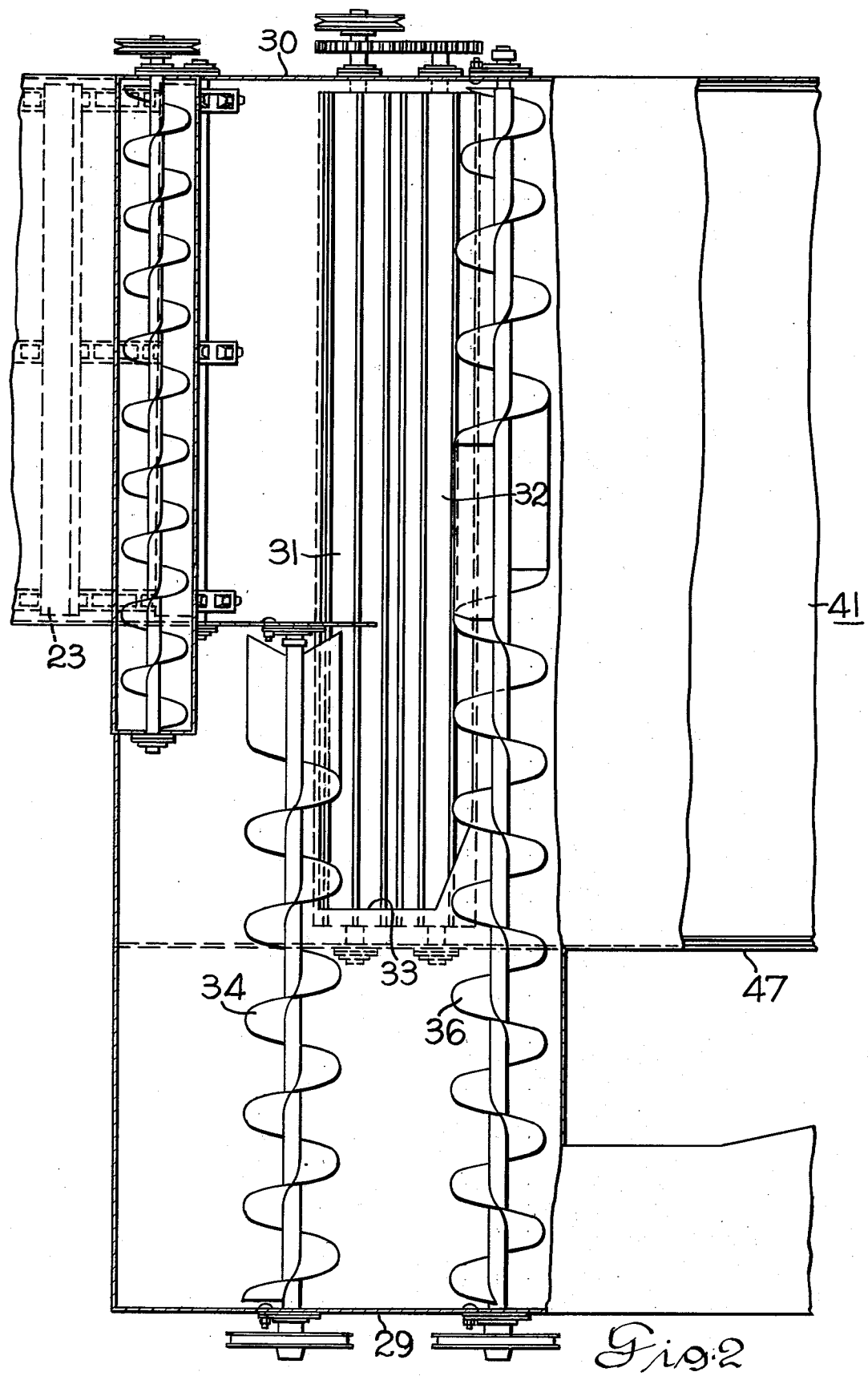
FIG. 2 is an enlarged top view of the combine shown in FIG. 1 with parts broken away so as to show the distribution augers and the accelerator rolls of the combine in which the present invention is used.

Referring also to FIGS. 2 and 3, the grain separated from the cut material by the threshing action of the cylinder 24 passes through the cage 26, which includes a concave 28, to a pair of counter-rotating accelerator rolls 31, 32 of ribbed construction. As shown in FIG. 2, the threshed material passes downwardly through a vertically open, transverse slot 33 directly above the accelerator rolls. A pair of augers 34, 36 convey grain and chaff passing through the cage and concave to the slot 33. The material passes through the slot and thence between the accelerator rolls and is accelerated downwardly by the latter into a rearwardly directed air stream, indicated by arrow 37, supplied by transverse blower 35. The blower 35 and the air outlet 40 extend transversely substantially the full distance between side walls 30, 47. The kernels of grain 38 are accelerated downwardly by the rolls 31, 32 to a speed substantially faster than the speed at which they would fall under the influence of gravity. The longitudinally horizontal air stream from outlet 40 blows most of the chaff 39 rearwardly over the shoe assembly 41 and thence out a downwardly opening exhaust hood 42 at the rear of the combine. The shoe assembly 41 includes a grain pan 46 at its forward end into which the accelerator rolls throw the grain 38. The shoe assembly 41 also includes a chaffer sieve 48 and a grain sieve 78. The shoe assembly 41 is mounted on sidewalls 30, 47 by links 71, 72 for longitudinal, horizontal oscillating or shaking movement. Referring also to FIG. 3, the lower end of link 72 is pivotally connected by a rubber bushing, not shown, to a pivot member 77 rigidly secured to the shoe assembly 41 and similarly the upper end of the link 72 is pivotally connected to sidewall 47. A pitman 76 is eccentrically pivoted on a transverse axis 70 to a pulley 73 driven by a belt 74 so as to produce a longitudinal oscillating or shaking movement producing mainly horizontal displacement of the grain pan. The eccentricity between the axis 75 of the pulley 73 and the axis 70 between the pitman 76 and the pulley is approximately 9.5 millimeters. The grain pan 46 extends across the width of the shoe assembly 41 and is substantially of the same lateral width as the length of the accelerator rolls 31, 32.

Referring to FIG. 2, it will be seen that the accelerator rolls and grain pan are substantially wider than the slat conveyor 23 and extend substantially the full distance between sidewalls 30, 47. When using a conventional grain pan construction, it was found that the downwardly thrown grain bounced violently, resulting in some grain actually bouncing out of the combine rather than passing rearwardly onto and through sieves 48 and 78 of the shoe assembly 41 to the grain auger 49. As in conventional combines, the grain is conveyed from the auger 49 to the grain bin 51 by means of a grain elevator, not shown. Particles not passing through the sieve 78 drop off the rear end thereof and slide downwardly to a tailings auger 52 which delivers the tailings to a tailings return elevator 53, which returns the tailings to the threshing chamber 56. In order to cushion the downwardly accelerating grain, some means to absorb the impact of the kernels was required. The present invention provides a layer 61 of grain on the grain pan 46 for absorbing the impact of the downwardly accelerated grain 38, thereby minimizing the bouncing of the accelerated grain upon its impacting the grain pan. In order to maintain the layer 61 of grain in the grain pan 46, I provide a plurality of longitudinally spaced and transversely extending baffles 62. The baffles 62, in the illustrated embodiment of the invention, are presented by transverse members 63 which are secured by rivets 64 to the flat, horizontally disposed bottom 66 of the grain pan 46. Each member 63 presents front and rear upwardly and rearwardly extending flanges which constitute the baffles 62. The baffles 62 are disposed at a relatively steep angle of 60° from the horizontal and extend upwardly approximately 13 millimeters above the upward facing surface of the bottom 66 of the pan 46. As the shoe assembly 41 oscillates longitudinally relative to the frame 17 on the links 71, 72, the excess grain on the pan will move rearwardly off the rear end thereof and onto the screen 48.

A sufficient layer 61 of grain is maintained on the grain pan 46 by the upwardly and rearwardly slanted transverse baffles 62 so as to effectively absorb the impact of the downwardly accelerating grain 38 and thereby prevent erratic bouncing and loss thereof. The shaking of the shoe assembly, by the shaking mechanism in the form of pitman 76 and pulley 73, during operation of the combine will cause the excess grain on the grain pan to move rearwardly and off the pan. During normal harvesting operations, the level of grain on the grain pan will be below the top of the baffles 62; however, the layer of grain will completely cover the bottom of the pan. It has been found through tests that the baffles extending 13 millimeters above the grain pan are operative to maintain a sufficient layer of grain and chaff on the grain pan to effectively absorb the impact of the downwardly accelerated grain and also to provide uniform conveying, preventing excessive buildup of the layer. Optimum height and angle of the baffles are determined by a balance of the opposing requirements of maintaining a minimum layer depth during operation to effectively absorb the impact while maintaining sufficient conveying action to essentially clear the layer after stopping material intake and allowing the machine to run. In addition, it is desirable to minimize the surface area of the baffles protruding through the layer during operation to reduce the probability of grain impact on the baffles. These parameters in conjunction with the shoe and pan motion determine the optimum height, angle and number of baffles. This invention effectively reduces the loss of grain due to erratic bouncing off the grain pan which would otherwise occur if the prior art grain pans were used in the illustrated combine having accelerator rolls.

The embodiments of the invention in which an exclusive property or previlege is claimed are defined as follows:

1. In a combine including a threshing cylinder, the combination comprising:

accelerator means receiving a mixture of threshed grain and chaff from said threshing cylinder and accelerating said grain and chaff downwardly;

means supplying a horizontal stream of air intersecting said grain and chaff accelerated downwardly by said accelerator means, said air stream carrying the chaff horizontally out of said downwardly accelerated grain; and a horizontally disposed grain pan supported on said combine for horizontal oscillation, said grain pan being disposed beneath said accelerator means at a level below said air stream and in receiving relation to said grain accelerated downwardly by said accelerator means through said air stream, said grain pan including a substantially flat bottom and a plurality of horizontally spaced baffles extending upwardly and horizontally, in the direction of said air movement, from said bottom of said grain pan to a height sufficient to retain a layer of grain on the bottom of said grain pan during oscillation thereof, said layer of grain serving to absorb the impact of the grain accelerated downwardly by said accelerator means.

2. The combination of claim 1 wherein said air stream is directed rearwardly and said baffles are longitudinally spaced.

3. The combination of claim 2 wherein said baffles extend upwardly and rearwardly at an angle of approximately 60° from the bottom of said grain pan.

* * * * *